United States Patent [19]

Kawasaki et al.

[11] 4,156,562

[45] May 29, 1979

[54] DIGITAL DISPLAY DEVICE FOR DIGITALLY DISPLAYING CORRECT EXPOSURE TIME

[75] Inventors: Masahiro Kawasaki, Tokyo; Eiichi Tano, Tachikawa; Sinji Urata, Asaka, all of Japan

[73] Assignee: Asahi Kogaku Kogyo Kabushiki Kaisha, Tokyo, Japan

[21] Appl. No.: 830,980

[22] Filed: Sep. 6, 1977

[30] Foreign Application Priority Data

Sep. 7, 1976 [JP] Japan .......................... 51/120194[U]

[51] Int. Cl.$^2$ .............................................. G03B 7/08
[52] U.S. Cl. .................................. 354/23 D; 354/53; 354/60 L
[58] Field of Search ...................... 354/23 D, 53, 60 L

[56] References Cited

U.S. PATENT DOCUMENTS

| 3,843,249 | 10/1974 | Kitaura ............................... 354/23 D |
| 4,035,815 | 7/1977 | Takahashi ........................ 354/23 D |
| 4,061,431 | 12/1977 | Toyoda ............................. 354/23 D |
| 4,083,055 | 4/1978 | Nishikawa et al. ............... 354/23 D |
| 4,084,166 | 4/1978 | Kawasaki et al. ................. 354/23 D |

*Primary Examiner*—Russell E. Adams

*Attorney, Agent, or Firm*—Sughrue, Rothwell, Mion, Zinn and Macpeak

[57] ABSTRACT

A digital display device is disclosed which is used for digitally displaying correct exposure time. The display device includes a repetitive pulse generator for generating repetitive pulses to control the charging-discharging operation of an integration capacitor. The number of clock pulses produced by a clock pulse oscillator during the period in which the charged voltage level on the capacitor is increased to the output level of a light measuring circuit which is proportional to the logarithmic value of the brightness of an object to be photographed starting from the voltage level of a reference voltage source is counted by a counter. An LED display is energized by the counter output through a decoder. At this time, the capacitor is charged at the highest possible speed by additional current from a charging speed-up control circuit in addition to constant current from a conventional constant current source, thereby eliminating the necessity of providing a conventional memory device for temporarily storing the immediately preceding digital data already displayed on the display during the period of time till the counter terminates to count the clock pulses necessary for presenting a new digital data to be displayed on the display.

3 Claims, 9 Drawing Figures

TIME (t)

DIGITAL DISPLAY DEVICE FOR DIGITALLY DISPLAYING CORRECT EXPOSURE TIME

BACKGROUND OF THE INVENTION

1. Field of the Invention

The present invention relates to a digital display device for digitally displaying the correct exposure time of a photographic camera.

2. Description of the Prior Art

Ammeters have been extensively employed as display devices for displaying the correct exposure time of photographic cameras. However, ammeters generally have the disadvantage that they are very prone to be damaged by mechanical shocks or vibrations and consequently have a low dependability factor particularly in the case where they are installed in portable instruments such as a camera. For this reason, light emitting diodes (hereinafter referred to as "LED's") or lamps have been recently accepted as a display device for camera exposure meters. However, prior art digital display devices utilizing such LED's or lamps still have the disadvantage that they require an extremely complicated circuit construction for converting analogue data representative of the brightness of an object to be photographed into the corresponding digital data. In addition, these digital display devices require a memory device for temporarily storing the immediately preceding digital data already displayed on the display during the period of time until a new digital data to be displayed on the display is obtained by the A-D converter.

SUMMARY OF THE INVENTION

It is therefore an object of the invention to provide a digital display device for digitally displaying correct exposure time which is capable of converting analogue data indicative of the brightness of an object to be photographed into the corresponding digital data with the highest possible accuracy by utilizing a comparatively simple circuit construction, as well as eliminating the necessity of providing a memory device for temporarily storing the immediately preceding digital data already displayed on the display device during the period of time until a new digital data to be displayed on the display device is obtained by the A-D converter.

The object of the invention is attained by the provision of a charging speed-up control circuit connected in parallel with a constant current source and operative to charge an integration capacitor at the highest possible speed by the composite current consisting of constant current from the constant current source and additional current from the charging speed-up control circuit. The digital display device is constructed to display digital data in accordance with clock pulses produced by a clock pulse oscillator and counted by a counter during the period in which the charged voltage level on the integration capacitor is increased to the output voltage level of a light measuring circuit proportional to the logarithmic value of the brightness of a photographic object starting from the voltage level of a reference voltage source.

The charging speed-up control circuit may comprise a resistor having one end connected to one pole of a dc power source together with one terminal of the constant current source, and two parallel connected transmission gates having their main current conduction paths connected between the other end of the resistor and one plate of the integration capacitor which is connected to the other terminal of the constant current source and which as the other plate connected to the other pole of the dc power source. One of the transmission gates is rendered conductive when the charged voltage level is increased to the voltage level of the reference voltage source, and the other transmission gate is made conductive when the charged voltage level is increased to the output voltage level of the light measuring circuit.

PREFERRED EMBODIMENT OF THE INVENTION

Figure 1:
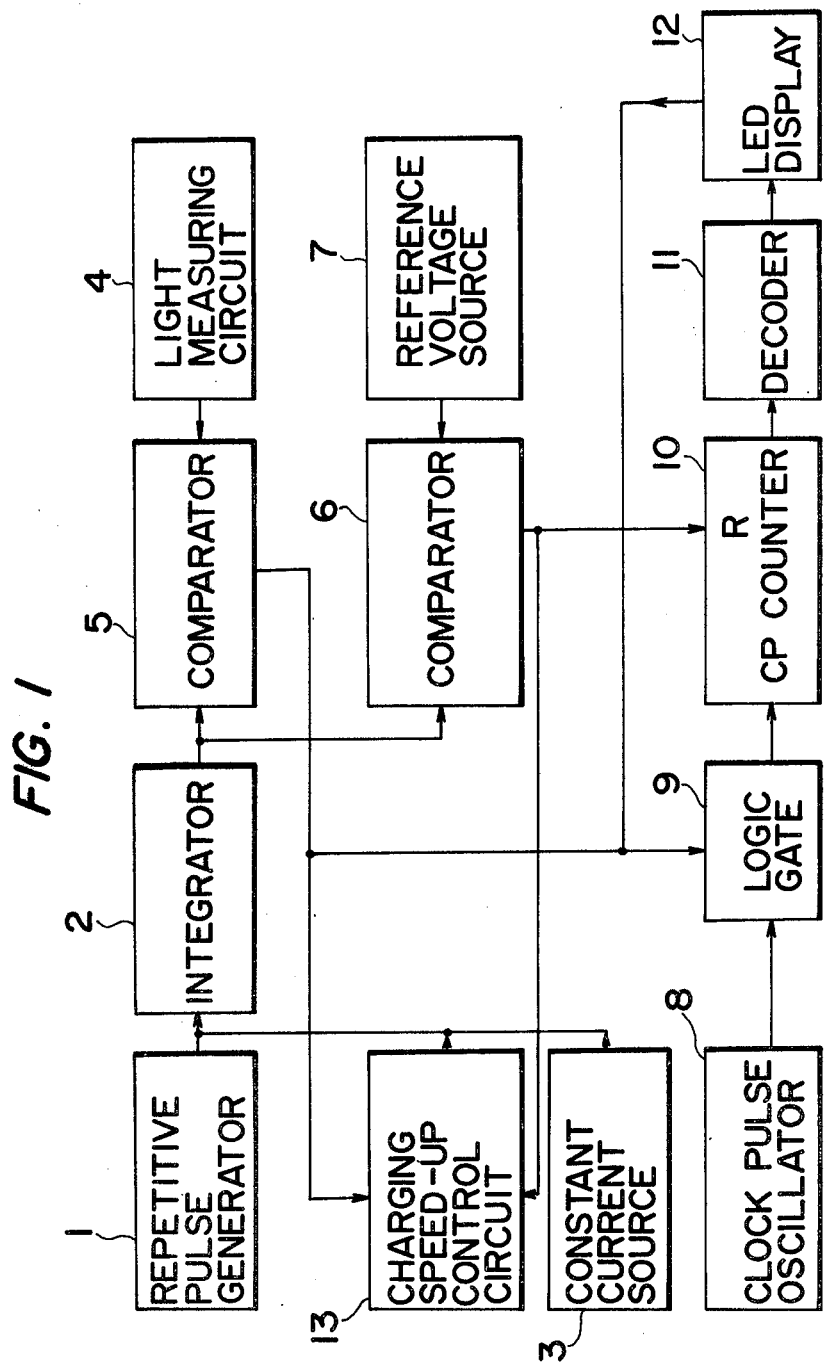
FIG. 1 is a schematic block diagram of a digital display device according to the invention for digitally displaying correct exposure time.

In FIG. 1, reference numeral 1 designates a repetitive pulse generator for generating repetitive pulses (FIG. 4A) to control the charging-discharging operation of a capacitor 29 (FIG. 3) included in an integration circuit 2. The capacitor 29 is charged under the control of an output pulse from the repetitive pulse generator 1 by constant current from a constant current source 3 and by additional current from a charging speed-up control circuit 13.

The voltage level on the capacitor 29 thus charged is compared by comparators 5 and 6 with the output voltage level of a light measuring circuit 4 and the voltage level of a reference voltage source 7, respectively. Clock pulses produced by a clock pulse oscillator 8 are applied to the clock pulse terminal CP of a counter 10 via a logic gate 9 having two input terminals connected respectively to the outputs of the comparator 5 and clock pulse oscillator 8. The counter 10 has its reset terminal R connected to the output of the comparator 6. Counted outputs from the counter 10 are applied via a decoder 11 to an LED display 12 for displaying the desired correct exposure time with respect to an object to be photographed by the camera in a digital form or mode.

Figure 2:
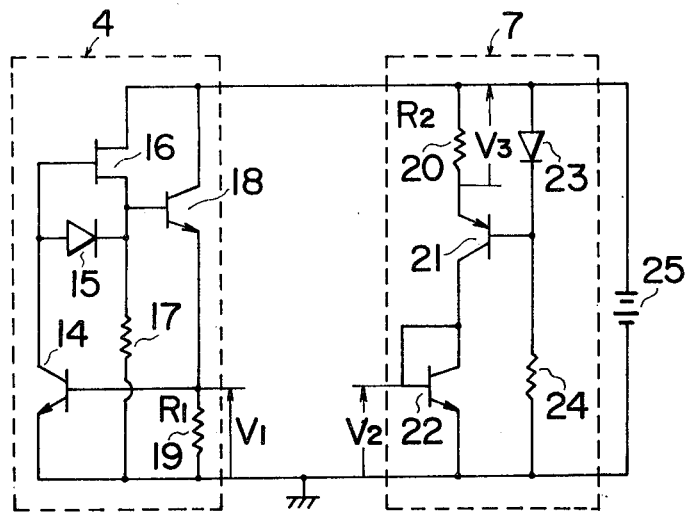
FIG. 2 is a practical circuit diagram of a portion of the digital display device including the light measuring circuit 4 and the reference voltage source 7 shown in FIG. 1.

FIG. 2 is a practical circuit diagram of a portion of the digital display device including the light measuring circuit 4 and the reference voltage source 7 shown in FIG. 1. Namely, the light measuring circuit 4 includes a photovoltaic element 15 such as a silicon photodiode which is arranged to receive a predetermined amount of light in proportion to, and whose photocurrent varies with the brightness of an object to be photographed. The photodiode 15 has its anode and cathode connected respectively to the gate and the source of a junction type source follower self-biased field effect transistor 16 (hereinafter referred to as "FET") having its drain connected to one pole, e.g., the positive pole of a dc power source 25, the negative pole of the dc power source 25 being connected to the ground. Also, the gate of the FET 16 is connected to the collector of an NPN type emitter grounded logarithmic compression transistor 14, and the source thereof is connected to the ground via a resistor 17 and to the base of an NPN type emitter follower transistor 18 having its collector connected directly to the positive pole of the dc power source 25. The emitter of the transistor 18 is connected to the ground via a resistor 19 and to the base of the transistor 14.

According to the light measuring circuit 4 constructed as mentioned above, a predetermined amount of photocurrent $i_p$ in response to the brightness of an object to be photographed flows through the photodiode 15, and is then fed from the collector of the transistor 14 back to the base thereof through a negative feedback loop including the photodiode 15, the self-biased FET 16 and the transistor 18. Consequently, as is easily understood by those skilled in the art, the base-to-emitter voltage V1 of the transistor 14 appearing across the resistor 19 is always substantially proportional to the logarithmic value of the brightness of an object to be photographed, used as the output of the light measuring circuit 4, and expressed by the following equation:

$$V1 = \frac{KT}{q} \cdot \ln \frac{i_p}{i_o} + V_{BE(io)} \quad (1)$$

where
K is Boltzmann's constant,
T is the absolute temperature,
q is the electron charge, and
$V_{BE}(i_o)$ is the base-to-emitter voltage of the transistor 14 when the collector current thereof is $i_o$.

On the other hand, the reference voltage source 7 includes a series circuit connected across the dc power source 25 and consisting of a light emitting diode 23 used as a constant voltage diode and a resistor 24. The junction point of the resistor 24 and the diode 23, i.e., the cathode thereof is connected to the base of a PNP type transistor 21 having its emitter connected via a resistor 20 to the positive pole of the dc power source 25, i.e., the anode of the diode 23. The collector of transistor 21 is connected to the collector and base functioning as the common anode of an NPN type transistor 22 used as a diode. The emitter of the transistor 22 functioning as the cathode of the diode is connected to the ground.

According to the reference voltage source 7 constructed as above-mentioned, assuming the voltage appearing across the resistor 20 to be V3 and the resistance thereof to be R2, then the collector current $i_1$ of the transistor 21 and the base-to-emitter voltage V2 of the transistor 22 are respectively expressed by the following equations:

$$i_l = \frac{V3}{R2} \quad (2)$$

$$V2 = \frac{KT}{q} \cdot \ln \frac{i_l}{i_o} + V_{BE(io)} \quad (3)$$

where
K is Boltzmann's constant,
T is the absolute temperature,
q is the electron charge, and
$V_{BE(io)}$ is the base-to-emitter voltage of the transistor 22 when the collector current thereof is $i_o$.

At this time, the terminal voltage V3 of the resistor 20 is equal to the difference (about 0.8 volts) between the forward terminal voltage (about 1.4 volts) of the diode 23 and the base-to-emitter voltage (about 0.6 volts) of the transistor 21, and the temperature dependance of the former is substantially identical to that of the latter.

Additionally, the variation in the forward voltage due to the forward current of the diode 23 is only about 30mV with respect to twice the variation of the forward current and is sufficiently small in comparison with the aforesaid differential voltage or the terminal voltage V3 of the resistor 20. For this reason, the terminal voltage V3 of the resistor 20 and in consequence the base-to-emitter voltage V2 of the transistor 22 each have a considerably low dependance with respect to variations in temperature and the voltage of the dc power source 25. Therefore, each of the aforesaid voltages V3 and V2 is a constant voltage which is not substantially affected by the variations in the temperature and the voltage of the dc power source 25. Accordingly, the base-to-emitter voltage V2 of the transistor 22 is used in the embodiment as the output terminal of the reference voltage source 7.

Figure 3:
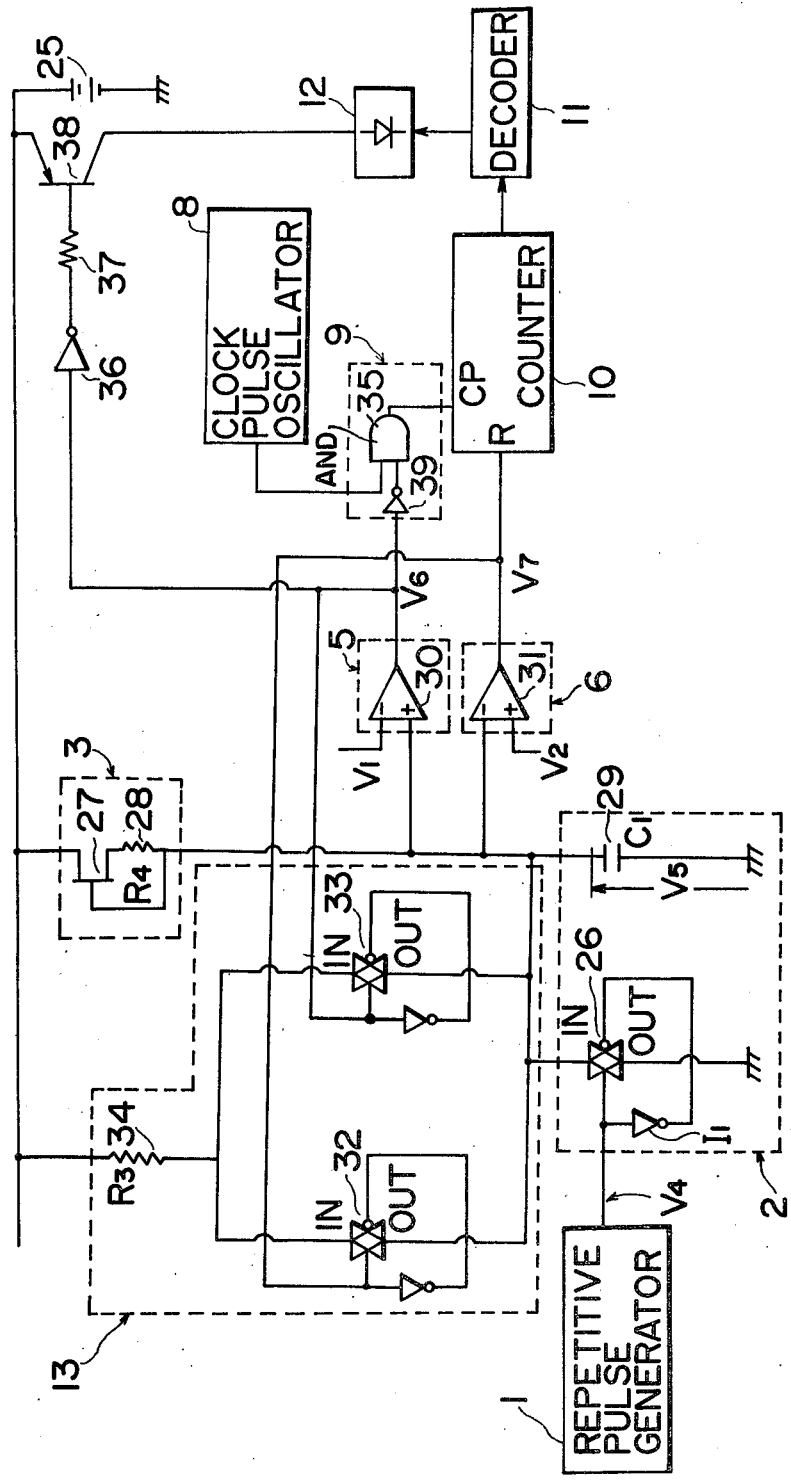
FIG. 3 is a practical circuit diagram, partly in block form, of a portion of the digital display device including the integration circuit 2, constant current source 3, charging speed-up control circuit 13, comparators 5 and 6, and logic gate 9.

FIG. 3 is a practical circuit diagram, partly in block form, of a portion of the digital display device including the integration circuit 2, constant current source 13, charging speed-up control circuit 13, comparators 5 and 6, and logic gate 9 shown in FIG. 1. The integration circuit 2 comprises a first transmission gate 26 constructed as hereinunder described and an integration capacitor 29. More specifically, the transmission gate 26, as is well known to those skilled in the art, comprises a complementary pair of one P-channel and one N-channel insulated gate enhancement type field effect transistors (hereinafter referred to as "IGFET's") the drains and the sources of which are respectively connected together and the commonly connected drain-source paths of which are used as their common main current conductive path, one gate of the IGFET's being used as a control terminal and connected to the other gate via an inverter I1. Thus, the control terminal of the transmission gate 26 is connected to the output of the clock pulse oscillator 1 and the main current conduction path thereof is connected in parallel with the capacitor 29, one plate of the capacitor 29 being connected to ground. The constant current source 3 comprises a junction type self-biased source follower FET 27 having its gate connected to the other plate of the capacitor 29 and its source connected directly to the positive pole of the dc power source 25, and a resistor 28 connected between the gate of the FET 27 and the source thereof. The charging speed-up control circuit 13 comprises a resistor 34 having one end connected to the positive pole of the dc power source 25, and second and third transmission gates 32 and 33 each having the same construction as the first transmission gate 26 and having their main current conduction paths connected in parallel between the other end of the resistor 34 and the other plate of the capacitor 29 included in the integration circuit 2. The comparator 5 comprises a differential amplifier type operational amplifier 30 having a positive side input terminal connected to the other plate of the capacitor 29 and a negative side input terminal to which is applied the output voltage of the light measuring circuit 4, i.e., the base-to-emitter voltage V1 of the transistor 14 (FIG. 2), the output terminal of the comparator 5 being connected to the control terminal of the third transmission gate 33. The comparator 6 comprises a differential amplifier type operational amplifier 31 having a negative side input terminal connected to the other plate of the capacitor 29 and a positive side input terminal to which is applied the output voltage of the reference voltage source 7, i.e., the base-to-emitter voltage V2 of the transistor 22 (FIG. 2), the output terminal of the comparator 6 being connected to the reset terminal R of the counter 10 and to the control terminal of the second transmission gate 32. The logic gate 9 comprises an inverter 39 having an input terminal connected to the output terminal of the comparator 5, and an AND gate 35 having two input terminals connected respectively to the output terminal of the inverter 39 and the output terminal of the clock pulse oscillator 8, the AND gate 35 having an output terminal connected to the clock pulse terminal CP of the counter 10. The output terminal of the counter 10 is connected via the decoder 11 to the common cathode terminal of the respective LED's (only one shown) jointly constituting the display 12. The common anode terminal of the LED's included in the display 12 is connected to the collector of a PNP type transistor 38 having its emitter connected to the positive pole of the dc power source 25. Thus, connected between the output terminal of the comparator 5 and the base of the transistor 38 is a series circuit consisting of an inverter 36 and a resistor 37.

The operation of the digital display device constructed as described above will now be described with reference to FIGS. 4A to 4F.

Figure 4A:
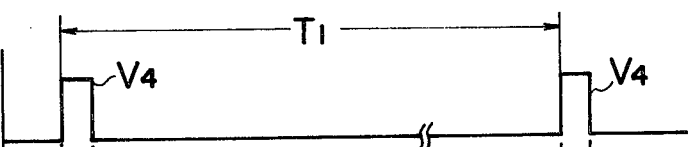
FIGS. 4A to 4F are waveform diagrams which show practical output waveforms from main circuit portions shown in FIG. 3.
Figure 4B:
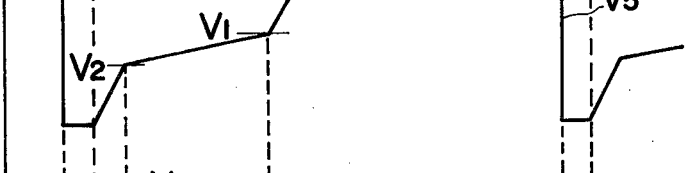
Figure 4C:
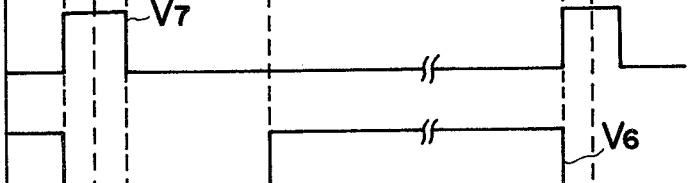
Figure 4D:
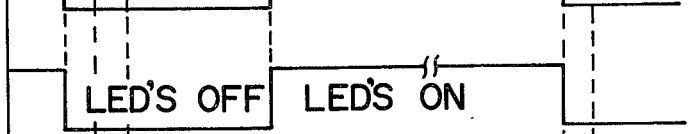
Figure 4E:
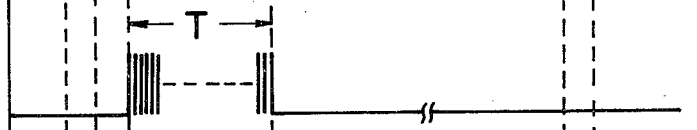

The repetitive pulse generator 1 is constructed to produce repetitive pulses V4 at a time interval corresponding to each display change-over duration T1 as shown in FIG. 4A. Thus, the first transmission gate 26 included in the integration circuit 2 is rendered conductive at the time t1 of the leading edge of each repetitive pulse V4 produced by the generator 1, and the integration capacitor 29 is instantaneously discharged through the now conducting transmission gate 26 as shown in FIG. 4B, whereby the terminal voltage V5 of the capacitor 29 is set at a binary coded logic level "0" (hereinafter referred to as "binary '0' level"). For this reason, the output level V6 of the comparator 5 is set at a binary "0" level as shown in FIG. 4D, while the output level V7 of the comparator 6 is set at a binary coded logic level "1" (hereinafter referred to as ("binary '1' level") as shown in FIG. 4C. Consequently, the second transmission gate 32 is rendered conductive while the third transmisson gate 33 is kept nonconductive. Then, at the time t2 of the trailing edge of each repetitive pulse V4 produced by the generator 1, the first transmission gate 26 is rendered nonconductive and, as a consequence, the integration capacitor 29 is charged by the composite current consisting of constant current i2 obtained through the constant current source 3 from the dc power source 25 and additional charging speed-up current i3 obtained through the resistor 34 and the now conducting second transmission gate 32 included in the charging speed-up control circuit 13 from the dc power source 25. Assuming the capacitance of the integration capacitor 29 to be C1, the additional charging speed-up current i3 to be sufficiently larger than the constant current i2, i.e., i3>>i2, and the resistance R2 of the resistor 34 to be sufficiently larger than the resistance of the conducting second transmission gate 32, then the charged voltage level V5 on the integration capacitor 29 at any time t is expressed by the following equation:

$$V5 = V_{DD}\left\{1 - \exp\left(-\frac{t - t2}{C1 \cdot R3}\right)\right\} \quad (4)$$

where $V_{DD}$ is the voltage value of the dc power source 25.

Figure 4F:
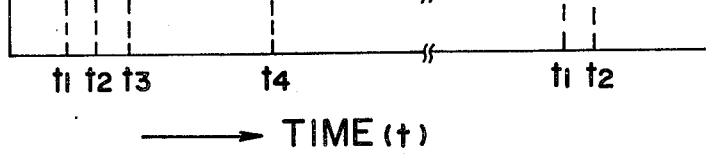

Thus, when the charged voltage level V5 on the capacitor 29 is increased to the voltage level V2 of the reference voltage source 7 at the time t3 then the output level V7 of the comparator 6 is lowered from a binary "1" level to a binary "0" level. For this reason, the reset condition of the counter 10 is released to start to count the number of clock pulses produced by the clock pulse oscillator 8 through the logic gate 9 (FIG. 4F). At this time t3, the second transmission gate 32 is made nonconductive and consequently the integration capacitor 29 is charged by only the constant current i2 from the constant current source 3. Namely, assuming the gate-to-source voltage of the FET 27 included in the constant current source 3 to be $V_{GS}$ and the resistance of the resistor 28 included therein to be R4, then the charged voltage V5 is expressed by the following equation:

$$V5 = \frac{V_{GS}}{C1 \cdot R4}(t - t3) + V2 \quad (5)$$

In the equation (5), the output voltage V2 of the reference voltage source 7 is given by the following equation:

$$V2 \approx V_{DD}\left\{1 - \exp\left(-\frac{t3 - t2}{C1 \cdot R3}\right)\right\} \quad (5)'$$

Further, when the charged voltage level V5 is increased at the time t4 to the output voltage level V1 of the light measuring circuit 4, then the output level V6 of the comparator 5 is increased from a binary "0" level to a binary "1" level, thereby disabling the counter 10 stopping the counting operation thereof. At the same time t4, the third transmission gate 33 is rendered conductive.

Accordingly, the integration capacitor 29 is charged by the composite current consisting of the constant current i2 from the constant current source 3 and additional current obtained through the resistor 34 and the now conducting third transmission gate 33 respectively included in the charging speed-up control circuit 13 from the dc power source 25. In a similar manner to equation (4), the charged voltage V5 is expressed by the following equation:

$$V5 = V_{DD} + (V1 - V_{DD})\exp\left(-\frac{t - t4}{C1 \cdot R3}\right) \quad (6)$$

In equation (6), the output voltage V1 of the light measuring circuit 4 is given by the following equation:

$$V1 \approx \frac{V_{GS}}{C1 \cdot R4}(t4 - t3) + V_{DD}\left\{1 - \exp\left(-\frac{t3 - t2}{C1 \cdot R3}\right)\right\} \quad (6)'$$

As is evident from the above description, the period of time T in which the counter 10 carries out its counting operation is defined by replacing V5 by V1 and t by t4 in equation (5), and consequently is expressed by the following equation:

$$T = (t4 - t3) = \frac{C1 \cdot R4}{V_{GS}} (V1 - V2) \qquad (7)$$

Substituting equations (1) and (3) into equation (7), the following equation is obtained:

$$V2 = \frac{K \cdot T}{q} \cdot \frac{C1 \cdot R4}{V_{GS}} \cdot \ln \frac{i_p}{i_1} \qquad (8)$$

In equation (8), photocurrent $i_p$ flowing into the photodiode 15 (FIG. 2) is expressed with respect to the apex value $B_v$ of the brightness B of an object to be photographed as follows:

$$i_p = i_{po} \cdot 2^{B_v} \qquad (9)$$

where $i_{po}$ is the value of photocurrent $i_o$ when the apex value $B_v$ is equal to zero.

Accordingly, equation (8) can be expressed by $$T = \frac{K \cdot T}{q} \cdot \frac{C1 \cdot R4}{V_{GS}} \cdot \ln \left( \frac{i_{po}}{i_1} \cdot 2^{B_v} \right) \qquad (10)$$

In equation (2), when the collector current $i_1$ of the transistor 21 (FIG. 2) is chosen to have a value equal to the aforesaid $i_{po}$, then the equation (10) can be expressed by $$T = \frac{K \cdot T}{q} \cdot \frac{C1 \cdot R4}{V_{GS}} \cdot B_v \cdot \ln 2 \qquad (11)$$

On the other hand, assuming the generating period of clock pulses from the clock pulse oscillator 8 to be $T_o$, then the number N of clock pulses counted by the counter 10 is expressed by the following equation:

$$N = T/T_o = \left( \frac{K \cdot T}{q} \cdot \frac{C1 \cdot R4}{V_{GS}} \cdot B_v \cdot \ln 2 \right) / T_o \qquad (12)$$

In equation (12), when the aforesaid generating period $T_o$ of clock pulses is chosen to satisfy the following equation $$T_o = \frac{K \cdot T}{q} \cdot \frac{C1 \cdot R4}{V_{GS}} \cdot \ln 2 \qquad (13)$$

then equation (12) becomes as indicated by the following equation:

$$N = B_v \qquad (12)'$$

Thus, when the LED display 12 is energized through the decoder 11 by the counted output from the counter 10, then it can display the correct exposure time presented by the apex value $B_v$ of the brightness B of an object to be photographed each time the repetitive pulses V4 are generated by the generator 1.

In this case, during the period of time in which the output level V6 of the comparator 5 is set at a binary "0" level, i.e., the period of time between t1 and t4, the transistor 38 is kept in a nonconductive state through the inverter 36 and the resistor 37 and consequently no illumination is emitted by the LED display 12. However, the no illumination period of time t1 to t4 of the LED display 12 can be shortened or reduced sufficiently to be insensible by the photographer so that the LED display 12 seems to him as if it continuously illuminates. This can be done by choosing the resistance of the resistor 34 included in the charging speed-up control circuit 13 appropriately. The digital display device of the invention further has the advantage of being capable of considerably reducing the time interval necessary for changing over the display on the LED display 12 in comparison with the prior art digital display devices by the provision of the charging speed-up control circuit 13.

It will be easily understood to those skilled in the art that the present invention is not limited by the embodiment described herein but may be practiced with any variations and modifications common in the technical concept of the invention.

What we claim is:

1. In a digital display device for digitally displaying correct exposure time of a photographic camera comprising an integration capacitor, a repetitive pulse generator operative to generate repetitive pulses for controlling the charging-discharging operation of said capacitor, a constant current source operative to deliver a constant current for charging said capacitor, a reference voltage source, a light measuring circuit operative to produce an output voltage proportional to the logarithmic value of the brightness of a photographic object, a clock pulse oscillator, a counter connected to said clock pulse oscillator to count the number of clock pulses produced by said clock pulse oscillator during the period in which the charged voltage level on said capacitor is increased to the output voltage level of said light measuring circuit starting from the voltage level of said reference voltage source, and display means connected to said counter for displaying digital data representative of the correct exposure time of the camera in accordance with the number of clock pulses counted by the counter, the improvement wherein a charging speed-up control circuit is provided in parallel with said constant current source to charge at the highest possible speed said capacitor by additional current produced therefrom in addition to the constant current from said constant current source.

2. A digital display device as defined in claim 1, wherein said charging speed-up control circuit comprises a resistor having one end connected to one pole of a dc power source, and a transmission gate having its main current conduction path connected between the other end of the resistor and one plate of said capacitor and rendered conductive when the charged voltage level on said capacitor by the constant current from said constant current source is increased to the voltage level of said reference voltage source prior to the output voltage level of said light measuring circuit, the other plate of said capacitor being connected to the other pole of the dc power source.

3. A digital display device as defined in claim 2, wherein said charging speed-up control circuit further includes another transmission gate having its main current conduction path connected in parallel with that of the first-mentioned transmission gate and rendered conductive when the charged voltage level on said capacitor is increased to the output voltage level of said light measuring circuit.

* * * * *